United States Patent [19]

Berry

[11] 4,065,773

[45] Dec. 27, 1977

[54] METHOD AND APPARATUS FOR GENERATING GRAY TONES IN AN INK JET PRINTER

[75] Inventor: James M. Berry, Deerfield, Ill.

[73] Assignee: Teletype Corporation, Skokie, Ill.

[21] Appl. No.: 673,561

[22] Filed: Apr. 5, 1976

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,373,437 | 3/1968 | Sweet et al. | 346/75 |
| 3,898,671 | 8/1975 | Berry et al. | 346/75 |
| 3,928,718 | 12/1975 | Sagae et al. | 346/75 X |
| 3,977,007 | 8/1976 | Berry et al. | 346/75 X |

*Primary Examiner*—George H. Miller, Jr.
*Attorney, Agent, or Firm*—W. K. Serp; J. C. Albrecht

[57] ABSTRACT

The illustrated printer effectively divides the surface of a paper into a large number of small areas termed dot locations each of which may or may not receive one or more ink drops depending upon the tonal level to be printed. Fifteen tonal shades are utilized with the tonal scale evenly divided by averaging the number of drops over a given number of dot locations to effectively generate fractional drop intensities. Selected ink drops generated by an ink jet are charged as determined by an incoming signal and the charged droplets directed at selected dot locations on the paper. The charge duration is not related to the frequency of the ink drop generation and further, the time of initiation of the drop charging period and the ink drop frequency are asynchronous. Thus, for a given charging period, a varying number of ink drops will be charged resulting in an averaging of the ink drops over several dot locations corresponding to a single tonal value.

4 Claims, 1 Drawing Figure

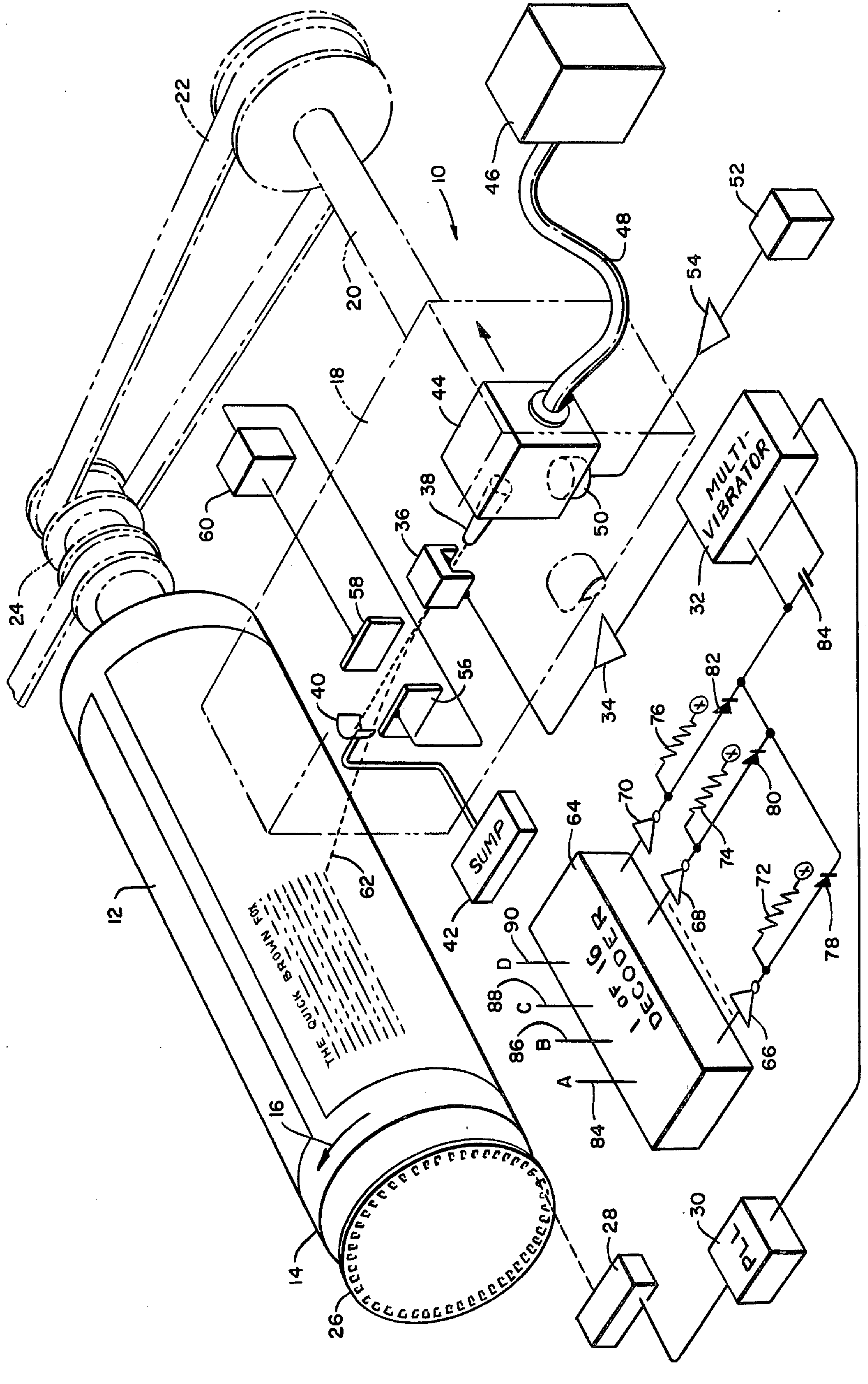
10
12
14
16
18
20
22
24
26
28
30
32
34
36
38
40
42
44
46
48
50
52
54
56
58
60
62
64
66
68
70
72
74
76
78
80
82
84
86
88
90
SUMP
MULTI-
VIBRATOR
THE QUICK BROWN FOX
A
B
C
D

METHOD AND APPARATUS FOR GENERATING GRAY TONES IN AN INK JET PRINTER

FIELD OF THE INVENTION

This invention relates to a method and apparatus for printing an image by ink jet recording techniques and more particularly relates to the production of such an image which exhibits an increased number of gray shades or half tones especially at the lighter end of the tonal scale.

BACKGROUND OF THE INVENTION

Various techniques have been described for producing shades or gray tones by ink jet printing. U.S. Pat. No. 3,604,846 granted to D. Behane et al. on Sept. 14, 1970 discloses a technique wherein a matrix of nine cells is formed with each cell being of the maximum intensity of the ink jet mechanism. As described by Behane, lighter gray shades are formed by recording or printing only some of the cells within the matrix area. The greater the number of cells printed in the given matrix area, the darker is the reproduction with all cells having the same size intensity. However, this approach introduces certain undesirable results in that a matrix having equal density dots selectively applied generally exhibits a relatively coarse visual texture. If the size of the matrix cell area are made large enough to contain a sufficient number of dots to accommodate a large range of gray tones, the reproduction itself lacks detail and is rather coarse in appearance.

Still another system is taught by R. G. Sweet in U.S. Pat. No. 3,373,437, granted Mar. 12, 1968. This reference discloses the formation of gray shades by depositing a different number of ink drops at various locations thereby varying the size of the printed dot and thus the darkness or tonal quality of the selected location. The use of multiple drops of ink deposited at one position to produce a black dot naturally leads to a half tone technique. The production of gray tones is accomplished by reducing the number of drops at each dot position in the lighter tones. However, to produce an acceptable distribution of tones at the lighter end of the tonal scale requires an excessive number of drops for each position. Thus, a particular limitation with the system taught by Sweet is that the number of drops required to provide a satisfactory tonal scale may be prohibitively large to achieve a maximum degree of darkness while still permitting sufficient gradations at the lighter tones.

A further arrangement for generating tonal gradations is described in U.S. Pat. No. 3,977,007 issued Aug. 24, 1976 entitled "Generating Gray Tones in Ink Jet Printers" by Berry et al. and having a common assignee with this application. This reference discloses a device wherein gray shades are generated by depositing one drop at each location with lighter tones created by leaving some of the positions blank. Darker tones are created by depositing two or more drops at some or all of the positions. Thus, a matrix is utilized and once all of the matrix cells have received one drop of ink, darker shades are produced by increasing by one drop selected cells in the matrix following a predetermined pattern.

The problems encountered in the generation of gray tones in a digital system which provides only a finite number of discrete tones may be considered from two aspects; firstly, the number of tomes to be used and secondly their distribution within the gray scale. Prior systems have often placed an inordinate amount of emphasis on the number of available tones rather than their distribution within the gray scale. Actually, the important consideration should be the number of visually equal increments available. Thus, the limiting factor in a facsimile system having a finite number of tones is the largest increment between any two of the tones. An excellent reproduction can be had with as few as fifteen tones provided they are distributed equally in terms of visual perception. Equal visual increments are expressed in terms of the Munsell Value scale, which bears a direct, but not linear, relation to the physical measurable optical density.

A second measure of quality in facsimile systems is resolution which is often oversimply equated to the number of scan lines per inch. For conveying information, high resolution is required only for the large density changes that is most notably from white to black. At the smaller density steps linear progression of gray shades will not result in a linear progression of drops at selected dot locations. The change from a complete lack of drops to one drop or from a completely blank location to one drop at a selected location produces pronounced visual changes in the perception of the gray shade. The change from one less than the maximum number of drops at a location to the maximum number of drops capable of being placed at that location produces a much smaller visual effect than at the lighter end of the total scale. In other words, the sensitivity of the human eye to various shades of gray follows a percentage of logarithmic relation rather than a linear curve. Thus, it will be appreciated that in each of the well-known systems, significant fewer tones are possible than the maximum number of drops at a selected location would at first suggest.

The illustrated embodiment is particularly adapted for generating tonal variations at the low end of the intensity scale and provides a far greater number of tonal variations within the low end of the range than has heretofore been possible. The device generates half drop intensities over a given area by what may be termed an averaging technique. Selected dot locations printed in response to the same tonal intensity may vary by one drop in a random manner so that the average number of drops over a sequence of dots in response to a single tonal value will average fractionally.

It is a main object of the present invention to produce a relatively large range of gray tones with an ink jet printer. It is still a further object to provide such a printer which produces a large number of variations at the lighter end of the tonal scale. Other objects, advantages, and features of the invention will be readily appreciated with reference to the following description of the accompanying drawings.

BRIEF DESCRIPTION OF THE DRAWING

The single FIGURE is a symbolic and schematic diagram of an ink jet recorder including certain features of this invention.

DETAILED DESCRIPTION

General

The illustrated printer effectively divides the surface of a paper into a large number of small areas termed dot locations. Each dot location may or may not receive one or more ink drops depending upon the tonal level to be printed as determined by binary information derived from the incoming data signal. If a dot location is to be left white, no ink drops will be placed at that location; however, a darker tone is produced by directing one or more drops at the location depending upon the shade of gray required. It will be appreciated that the human eye does not respond to the tonal quality of a single dot location, but rather integrates the tonal level for a given area. For example, if 15 of 16 adjacent dot locations are each provided with a single ink drop, the remaining blank dot location will not be visually noticed and this configuration will have a lighter tonal quality than a similar sixteen dot area with each dot having a single ink drop. As will be subsequently considered, the illustrated embodiment utilizes 15 tonal shades. Although limited in number, these tonal shades provide a greater visual variation than obtainable with prior systems by expanding the lighter end of the tonal scale. As will be more fully appreciated, the expansion of the lighter end of the tonal scale is accomplished by averaging the number of drops over a given area so as to effectively generate fractional drop intensities.

With particular reference to FIG. 1, the recorder 10 applies drops to a record medium 12, in the form of a sheet of paper, which is carried on a rotating platen drum 14 in the direction indicated by the arrow 16. A recording head 18 (indicated in phantom) traverses from left to right across the length of the platen 14 thereby helically scanning the paper 12. Serving to move the print head 18 along the platen 14 is a drive shaft 20, coupled to the platen by a belt drive and pulley arrangement 22. The platen 14, in turn, is coupled to a motor (not shown) by a belt and pulley combination 24. Serving to generate a signal, related to the speed and position of the platen 14, is an apertured timing disc 26 positioned adjacent a transducer 28. As the aperturs break a light beam in the transducer 28 a series of pulses are generated. This pulse train is fed through a frequency multiplier in the form of a phase-locked loop 30 and to the toggle input of a one-shot multivibrator 32. Each pulse output from the phase-locked loop 30 corresponds to a single dot location on the paper and thus the multivibrator 32 is triggered for each dot location. As will be subsequently considered, the period of the multivibrator is determined by the binary level (ABCD) of a tonal signal derived from an incoming information signal. The output of the multivibrator 32 is fed through an amplifier 34 which, in turn drives a charing electrode 36 forming a component of the print head 18. The print head 18 generates a stream of ink from a nozzle 38 generally towards a mask or catcher 40. In the absence of a charging signal at the charging electrode 36, all of the ink drops emitted by the nozzle 38 strike the catcher 40 and pass through a drain sump 42 for discharge or recirculation. Serving to redirect selected drops of ink onto the paper 12 at the desired dot locations, the output of the amplifier 32 applied to the charging electrode 36 deflects the ink stream towards the desired dot location on the paper 12.

The ink is fed to the nozzle 38 from a nozzle housing 44 connected to an ink pressure source 46 connected thereby by a flexible tubing 48. A piezoelectric ceramic transducer 50 driven by an oscillator 52 through an amplifier 54 introduces an ultrasonic vibration into the ink jet which causes the jet to disintegrate synchronously into evenly spaced equally sized drops in the vicinity of the charging electrode 36. The frequency rate of the ink drops may be considered $f_d$ with the reciprocal $1/f_d$ being the drop period or time interval between drops. The duration of the signal on the charging electrode 36 is determined by the period of the multivibrator 32 with its maximum duration corresponding to the total time period which the nozzle 38 is directed at a selected dot location on the paper 12. In the illustrated embodiment, the frequency of the drop clock is selected to allow a maximum of eight drops to be deposited at any one dot location. It will be appreciated that the maximum number of drops per dot location is provided by way of example and may be varied without departing from the scope and spirit of the invention.

The ink jet is electrically shielded by the charging electrode 36 in the vicinity of the drop break-off point and since the ink is conductive, the drops acquire an electric charge proportioned to the voltage applied to the charging electrode 36. Downstream of the charging electrode 36 a transverse electrostatic field causes the drops to deflect in proportion to their charge. Serving to create this electrostatic field is a pair of deflection plates 56 and 58 which are maintained at a high voltage potential by a suitable power source 60. As mentioned, the electrostatic field between the plates 56 and 58 combines with the electrostatic charge on selected passing drops of ink causing them to vary from their original path towards the catcher and into a curved trajectory 62 striking the paper at a predetermined dot location.

Hereinafter, additional specific frequency relationships will be provided to clarify explanation. However, these frequencies are provided by way of example and should not be construed in limitation since various other frequencies may be utilized without departing from the scope and spirit of this invention. The multivibrator 32 serves to generate a signal which selectively charges certain of the droplets leaving the nozzle 38. The charging potential applied to the droplets has two states, namely on and off. The number of drops which are directed at each dot location on the paper 12 is determined by the duration of the charging signal. The longer the time period of the multivibrator 32 pulse $P_w$ the greater will be the number of drops deflected to the paper 12. It will be appreciated that only these drops which have been charged will be deflected while the remaining drops will pass through the field substantially unaffected striking the catcher 40. In the illustrated example, the drop clock frequency 52 is selected for a rate of 400 kilohertz which corresponds to an individual drop period of 2.5 microseconds ($1/f_d$). As previously mentioned, the triggering signal to the input of the multivibrator is derived from the motion of the drum by means of the shaft encoder 28 and the phase locked loop frequency multiplier 30. Each pulse output corresponds to a single dot location on the paper. In the illustrated embodiment the output of the phase locked loop is 50 kilohertz and thus 20 microseconds is the time interval during which the desired drops may strike a selected dot location on the paper. Since the drops are generated at a rate of one every 2.5 microseconds and since the total period during which a dot may receive drops is approximately 20 microseconds, a maximum of eight drops may be printed at any single dot location. It should be noted that there is no controlled phase relationship between the drop frequency $f_d$ and the output of the phase locked loop 32. The asynchronous nature of these two frequencies is a feature of the illustrated embodiment. If desired additional circuitry may be incorporated to assure asynchronous operation as described in U.S. Pat. No. 3,898,671 issued Aug. 5, 1975 entitled "Ink Jet Recording" and having a common inventor and assignee with this application. Prior devices have devoted considerable attention to the synchronization of various clocks in an ink jet system. The illustrated embodiment particularly avoids such considerations and the attendant circuit complexities and effectively utilizes the asynchronous nature of the two signals to an advantage.

Binary data is fed into a 1 of 16 decoder 64 with each of the outputs two through fifteen driving an inverter 66 which respectively select appropriate timing resistors 72, 74 and 76 for the multivibrator 32. The first output level from th decoder corresponds to a total absence of drops at a dot location is not utilized and thus the period of the multivibrator 32 is zero. The sixteenth output from the decoder is reserved as a control word decoder and does not form a part of this invention. Each of the fourteen remaining outputs of the decoder drive selected open collector inverters having selected timing resistors connected to the positive terminal of the supply source. The outputs of each of the inverters are each connected through isolation diodes 78, 80 and 82 to one control terminal of the multivibrator 32. A timing capacitor 84 is connected to the multivibrator and serves to complete the R-C timing circuit for the multivibrator 32. Thus in response to an output pulse from the phase locked loop, the multivibrator output goes high for a time period ($P_w$) determined by which of the inverters is selected by the decoder 64. The particular timing resistor selected by the decoder is determined by a four level binary signal fed to the decoder 64 via lines 84, 86, 88 and 90.

APPENDIX A

| I Gray Tone | II Binary Code | III Optical Density | IV Munsell Value | V Time On Micro Sec. | VI Ave. No. Drops/Dot |
|---|---|---|---|---|---|
| White 1 | 0000 | 0.05 | 9.56 | 0 | 0 |
| 2 | 0001 | 0.10+ | 9.12 | .31 | $\frac{1}{8}$ |
| 3 | 0010 | 0.15+ | 8.68 | .69 | $\frac{1}{4}$ |
| 4 | 0011 | 0.21 | 8.23 | .94 | $\frac{3}{8}$ |
| 5 | 0100 | 0.27− | 7.79 | 1.25 | $\frac{1}{2}$ |
| 6 | 0101 | 0.33− | 7.35 | 1.56 | $\frac{5}{8}$ |
| 7 | 0110 | 0.39+ | 6.91 | 2.03 | 13/16 |
| 8 | 0111 | 0.45+ | 6.47 | 2.50 | 1 |
| 9 | 1000 | 0.53− | 6.02 | 3.44 | $1\frac{3}{8}$ |
| 10 | 1001 | 0.60+ | 5.58 | 4.38 | $1\frac{3}{4}$ |
| 11 | 1010 | 0.69− | 5.14 | 5.31 | $2\frac{1}{8}$ |
| 12 | 1011 | 0.78 | 4.69 | 6.88 | $2\frac{3}{4}$ |
| 13 | 1100 | 0.87− | 4.25 | 9.06 | $3\frac{5}{8}$ |
| 14 | 1101 | 0.97+ | 3.81 | 12.50 | 5 |
| Black15 | 1110 | 1.09 | 3.37 | 20.00 | 8 |

Particular reference is made to Appendix A wherein the various on times for the multivibrator (column V) are set forth. In response to the binary code 0000 (column II) at lines 84, 86, 88 and 90 the multivibrator timing is approximately zero and in response to a binary code of 0001 the first timing resistor is selected with the on time of the multivibrator being 0.31 microseconds. The second timing resistor generates a 0.69 microsecond period and the last a maximum on time of 20 microseconds which corresponds to 8 drops at the selected dot in the paper 12. The remaining columns provide the corresponding Optical Density (column III), and Munsell Values (column IV) for comparative purposes. The timing periods of the multivibrator 32 are selected to provide a uniform increase in the Munsell Value of the various drop combinations at the selected dot locations. It will be noted that the average number of drops per dot for certain of the tonal values (column I) is fractional (column VI). It will be further appreciated that a fractional dot cannot be placed at a particular dot location on the paper. However, the illustrated embodiment effectively creates the visual effect of fractional drops at the dot locations by averaging the drops over a number of dot locations of the same gray scale intensity. That is, while a dot location may not contain a half drop, one drop may be located in one of two cells resulting in the average of one half drop per dot. The drop variations are averaged by the human eye producing the same visual effect as would be obtained by applying a half drop to each of the drop locations.

For example, a tonal level of 9 (column I) will generate $1\frac{3}{8}$ drops per dot, that is, on the average, within a group of eight dots, five will have one drop and three will have two drops. As previously mentioned, the output of the clock 52 and of the pulses lock loop 30 are asynchronous and therefore the phase relationship between the two clocks continually shifts. This constant frequency shift results in a random variation by one in the number of drops which ae charged by the electrode during printing of a field of constant tonal value. The width of the pulse $P_w$ may be expressed by the following equation: $P_w = (N + X)/f_d$ wherein $N$ is a whole number or zero, $f_d$ is the drop rate and $X$ is a fractional number less than one. Thus, rather than utilizing elaborate means to synchronize the drop clock 52 to the output of the shaft encoder, the illustrated embodiment utilizes the asynchronous nature of the two frequencies to average the drops in a random manner over a selected number of dots. Since the shaft encoder 28 is generated by mechanical means, the frequency varies somewhat about a nominal value resulting in a continuing variation in the phase relationship of the two frequencies.

Although the invention has been particularly shown and described with reference to a preferred embodiment thereof, it will be understood that various changes in form and detail may be made without departing from the spirit and scope of the invention.

What is claimed is:

1. An apparatus for printing a selected number of ink drops upon a medium at a plurality of discrete dot locations by means of an ink jet which generates a stream of drops at a rate $f_d$ comprising:

means for generating a signal related to the position of the ink jet with respect to each dot location, said signal generating means being asynchronous with respect to said drop rate $f_d$;

means responsive to said dot signal for generating a pulse in response thereto, the width $P_w$ of said pulse being related to a selected tonal value and determined by the relationship:

$$P_w = (N + X)/f_d$$

wherein $N$ is a whole number or zero and $X$ is a fractional number less than one;

means responsive to said tonal pulse for directing a number of drops at a dot location on said paper so that the number of drops per dot in a series of dots having the same tonal pulse width $P_w$ will vary by one and the overall tonal shade of the dot series will be equivalent to that which would be obtained by depositing fractional drops at each dot location in the series.

2. The apparatus of claim 1 wherein the pulse width $P_w$ is determined by means of the frequency of a multivibrator said multivibrator being triggered by sais signal generator, and means for varying the period of said multivibrator in accordance with the total value of the image to be printed.

3. A method for printing a selected number of ink drops upon a medium at a plurality of discrete dot locations by means of an ink jet generating a stream of drops at a predetermined rate $f_d$ comprising the steps of:

generating a signal related to the position of the ink jet with respect to each dot location, the generated signal being asynchronous with respect to the drop rate;

generating a drop charging pulse in response to the dot signal having a pulse width $P_w$ determined by the relationship:

$$P_w = (N + X)/f_d$$

wherein $N$ is a whole number of zero and $X$ is a fractional number less than one and wherein $P_w$ is related to a selected tonal value to be printed;

directing a number of the drops as determined by the pulse width $P_w$ at a dot location on the paper so that the number of drops per dot in a series of dots having the same pulse width $P_w$ will vary by one so that the overall tonal shade of the dot series will be equivalent to that which would be obtained by depositing fractional drops at each dot location in the series.

4. The method of claim 3 wherein the pulse width is determined by means of the frequency of a multivibrator further comprising the step of:

varying the period of the multivibrator in accordance with the tonal value of the image to be printed.

* * * * *